United States Patent
Mayumi et al.

(10) Patent No.: US 9,666,087 B2
(45) Date of Patent: May 30, 2017

(54) COMPUTER-READABLE RECORDING MEDIUM STORING EDUCATION SUPPORT PROGRAM, EDUCATION SUPPORT METHOD, AND EDUCATION SUPPORT APPARATUS

(71) Applicant: FUJITSU LIMITED, Kawasaki-shi, Kanagawa (JP)

(72) Inventors: Hidehiko Mayumi, Kawasaki (JP);
Toshio Tanaka, Yokohama (JP);
Takeaki Kobayashi, Yokohama (JP);
Shigenori Sasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 200 days.

(21) Appl. No.: 14/525,560

(22) Filed: Oct. 28, 2014

(65) Prior Publication Data

US 2015/0125843 A1 May 7, 2015

(30) Foreign Application Priority Data

Nov. 6, 2013 (JP) ................ 2013-230694

(51) Int. Cl.
*G09B 5/00* (2006.01)
*G09B 5/12* (2006.01)
(Continued)

(52) U.S. Cl.
CPC .............. *G09B 5/00* (2013.01); *G06F 3/048* (2013.01); *G06F 17/274* (2013.01); *G09B 5/12* (2013.01)

(58) Field of Classification Search
CPC .............. G06F 3/048; G09B 5/00; G09B 5/12
(Continued)

(56) References Cited

U.S. PATENT DOCUMENTS 4,839,853 A * 6/1989 Deerwester ............. G06F 17/21
6,347,333 B2 * 2/2002 Eisendrath ............. G06Q 10/10
434/350
(Continued)

FOREIGN PATENT DOCUMENTS

JP 2002-323847 11/2002
JP 2013-142718 7/2013
(Continued)

OTHER PUBLICATIONS

Korean Office Action mailed Dec. 18, 2015 in related Korean Application No. 10-2014-0149788.
(Continued)

*Primary Examiner* — Nikolai A Gishnock
(74) *Attorney, Agent, or Firm* — Westerman, Hattori, Daniels & Adrian, LLP

(57) ABSTRACT

An education support method includes searching for first student information corresponding to a student whose evaluation score has been improved and discussion information on the basis of evaluation-score-and-group information in which the discussion information identifying a group discussion, group information identifying a group, student information identifying a student and an evaluation score of the student are associated with one another; searching for second student information including group information associated to the first student information on the basis of the first student information and the discussion information; and generating created group information that is associated with the second student information and a selected student information. Further, a computer-readable recording medium storing an education support program that, when executed, causes a computer to perform the education support method.

20 Claims, 9 Drawing Sheets

(51) Int. Cl.
  *G06F 3/048* (2013.01)
  *G06F 17/00* (2006.01)
  *G06F 17/27* (2006.01)

(58) Field of Classification Search
  USPC .............................. 715/733, 743, 753, 758
  See application file for complete search history.

(56) References Cited

U.S. PATENT DOCUMENTS

| | | | | |
|---|---|---|---|---|
| 6,356,864 | B1* | 3/2002 | Foltz | G06F 17/2785 |
| | | | | 434/353 |
| 6,370,355 | B1* | 4/2002 | Ceretta | G09B 7/02 |
| | | | | 434/323 |
| 6,652,287 | B1* | 11/2003 | Strub | G09B 5/00 |
| | | | | 434/322 |
| 8,412,736 | B1* | 4/2013 | Arnold | G06F 17/30539 |
| | | | | 706/21 |
| 8,539,359 | B2* | 9/2013 | Rapaport | G06Q 10/10 |
| | | | | 709/217 |
| 8,719,248 | B2* | 5/2014 | Mukhopadhyay | G06F 17/274 |
| | | | | 707/706 |
| 8,893,024 | B2* | 11/2014 | Wanas | G06Q 10/10 |
| | | | | 715/733 |
| 8,942,986 | B2* | 1/2015 | Cheyer | G06F 17/3087 |
| | | | | 704/231 |
| 8,965,974 | B2* | 2/2015 | Abrol | H04L 67/22 |
| | | | | 709/204 |
| RE45,661 | E* | 9/2015 | Knight | |
| 9,195,996 | B1* | 11/2015 | Walsh | H04L 12/588 |
| 2002/0160350 | A1 | 10/2002 | Tanaka et al. | |
| 2007/0141544 | A1* | 6/2007 | Nakane | G06F 17/2765 |
| | | | | 434/353 |
| 2007/0214097 | A1* | 9/2007 | Parsons | G06F 17/30864 |
| | | | | 706/12 |
| 2008/0046394 | A1* | 2/2008 | Zhou | G06F 17/30705 |
| | | | | 706/52 |
| 2009/0198488 | A1* | 8/2009 | Vigen | G06F 17/274 |
| | | | | 704/9 |
| 2011/0173225 | A1* | 7/2011 | Stahl | G06Q 30/04 |
| | | | | 707/769 |
| 2012/0191716 | A1* | 7/2012 | Omoigui | H01L 27/1463 |
| | | | | 707/740 |
| 2012/0296833 | A1* | 11/2012 | Sharma | G06Q 10/10 |
| | | | | 705/300 |
| 2014/0068457 | A1* | 3/2014 | Lindsay | G06Q 10/10 |
| | | | | 715/751 |
| 2014/0156996 | A1* | 6/2014 | Heppe | G06Q 30/00 |
| | | | | 713/175 |
| 2014/0295384 | A1* | 10/2014 | Nielson | G06F 17/275 |
| | | | | 434/157 |
| 2014/0316768 | A1* | 10/2014 | Khandekar | G06F 17/30654 |
| | | | | 704/9 |
| 2014/0372226 | A1* | 12/2014 | Pavley | G06Q 30/0269 |
| | | | | 705/14.66 |
| 2015/0079576 | A1 | 3/2015 | Obae et al. | |
| 2015/0081277 | A1* | 3/2015 | Behi | G06F 17/2705 |
| | | | | 704/9 |
| 2015/0317757 | A1* | 11/2015 | Mihai | G06Q 50/20 |
| | | | | 705/326 |
| 2015/0370834 | A1* | 12/2015 | Smith | G06F 17/30672 |
| | | | | 707/706 |
| 2016/0062967 | A1* | 3/2016 | Cantarero | G06F 17/241 |
| | | | | 715/230 |

FOREIGN PATENT DOCUMENTS

| | | |
|---|---|---|
| JP | 2013-142718 A | 7/2013 |
| KR | 2001-0110963 | 12/2001 |
| KR | 10-2009-0001747 | 1/2009 |
| KR | 10-2009-0001747 A | 1/2009 |
| KR | 10-2012-0076632 | 7/2012 |
| KR | 10-2012-0076632 A | 7/2012 |

OTHER PUBLICATIONS

Office Action dated Jun. 30, 2016, issued in counterpart Korean Patent Application No. 10-2014-0149788, with English translation. (7 pages).

* cited by examiner

FIG. 2

| SUBJECT | | | ZZZZZ | | | | | | |
|---|---|---|---|---|---|---|---|---|---|
| STUDENT | | DATE | 1/9 | 1/16 | 1/23 | 1/30 | 2/6 | 2/13 | 2/20 |
| AAAA | SCORE | EVALUATION ITEM 1 | 2 | 2 | (4) | (4) | 4 | | |
| | | EVALUATION ITEM 2 | 3 | 4 (1) | 3 (3) | 4 (7) | 4 | | |
| | | EVALUATION ITEM 3 | 3 | 3 | 4 | 4 | 4 | | |
| | GROUP | | aaa | bbb | ccc | dddd | bbb | | |
| BBBB | SCORE | EVALUATION ITEM 1 | 3 | 2 (5) | 3 | 3 | | | |
| | | EVALUATION ITEM 2 | 3 | 3 | 2 | 3 | | | |
| | | EVALUATION ITEM 3 | 2 | 3 | 3 | 2 | | | |
| | GROUP | | cccc | bbb | ddd | aaa | | | |
| CCCC | SCORE | EVALUATION ITEM 1 | 1 | (3) | (2) | 2 | | | |
| | | EVALUATION ITEM 2 | 2 (2) | 2 (4) | 2 | 2 | | | |
| | | EVALUATION ITEM 3 | 2 | 2 | 2 | 2 | | | |
| | GROUP | | aaa | ccc | bbb | dddd | | | |
| DDDD | SCORE | EVALUATION ITEM 1 | 4 | 3 | 4 | 4 (8) | 4 | | |
| | | EVALUATION ITEM 2 | 5 | 5 | 5 | 5 | 4 | | |
| | | EVALUATION ITEM 3 | 3 | 4 | 3 | 4 | 5 | | |
| | GROUP | | bbb | 4 (5) | ccc | dddd | aaa | | |
| EEEE | SCORE | EVALUATION ITEM 1 | 2 | 2 (5) | 1 | 1 | ↑ | | |
| | | EVALUATION ITEM 2 | 3 | 3 | 2 | 3 | | | |
| | | EVALUATION ITEM 3 | 2 | 2 | 2 | 2 | | | |
| | GROUP | | ccc | aaa | ddd | bbb | aaaa | | |
| FFFF | SCORE | EVALUATION ITEM 1 | 5 | 5 | 5 | 5 | | | |
| | | EVALUATION ITEM 2 | 4 | 5 | 5 | 5 | | | |
| | | EVALUATION ITEM 3 | 5 | 5 | 5 | 5 | | | |
| | GROUP | | ddd | aaa | ccc | ddd | aaa | | |
| GGGG | SCORE | EVALUATION ITEM 1 | 2 | 3 (5) | 2 | 3 | | | |
| | | EVALUATION ITEM 2 | 4 | 4 | 4 | 4 | | | |
| | | EVALUATION ITEM 3 | 2 | 3 | 3 | 2 | | | |
| | GROUP | | bbb | ccc | ccc | aaa | | | |
| HHHH | SCORE | EVALUATION ITEM 1 | 2 | 3 (5) | 2 | 2 | | | |
| | | EVALUATION ITEM 2 | 4 | 3 | 4 (6) | 4 | | | |
| | | EVALUATION ITEM 3 | 2 | 2 | 2 | 3 | | | |
| | GROUP | | ccc | bbb | aaa | ccc | aaa | | |

NON-ATTENDANCE    22

FIG. 4

| STUDENT IDENTIFIER | STUDENT NAME | IP ADDRESS |
|---|---|---|
| 12301 | AAAA | XXX.YYY.ZZZ1 |
| 12302 | BBBB | XXX.YYY.ZZZ2 |
| 12303 | CCCC | XXX.YYY.ZZZ3 |
| 12304 | DDDD | XXX.YYY.ZZZ4 |
| ⋮ | ⋮ | ⋮ |

52

COMPUTER-READABLE RECORDING MEDIUM STORING EDUCATION SUPPORT PROGRAM, EDUCATION SUPPORT METHOD, AND EDUCATION SUPPORT APPARATUS

CROSS-REFERENCE TO RELATED APPLICATION

This application is based upon and claims the benefit of priority from the prior Japanese Patent Application No. 2013-230694 filed on Nov. 6, 2013 the entire contents of which are incorporated herein by reference.

FIELD

The embodiments discussed herein are related to an education support program, an education support method, the education support apparatus and an education support system.

BACKGROUND

A technology has been proposed that stores cooperative learning data in a storage area to be shared between a plurality of students, detects an access request to the cooperative learning data correspondingly to students and calculates the number of access request to the cooperative learning data correspondingly to the students in a cooperative learning of the plurality of students. In the technology, the number of access requests of each of the plurality of students is compared with one another, a comparison result is notified or an electronic mail is transmitted to an instructor or a student according to the comparison result.

A related technique is disclosed in, for example, Japanese Laid-Open Patent Publication No. 2002-323847.

SUMMARY

According to an aspect of the invention, a computer-readable recording medium storing an education support program that, when executed, causes a computer to perform an education support method, the education support method includes searching for first student information corresponding to a student whose evaluation score has been improved and discussion information on the basis of evaluation-score-and-group information in which the discussion information identifying a group discussion, group information identifying a group, student information identifying a student and an evaluation score of the student are associated with one another; searching for second student information including group information associated to the first student information on the basis of the first student information and the discussion information; and generating created group information that is associated with the second student information and a selected student information.

According to an aspect of the invention,

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of evaluation score and group databases;

FIG. 4 is a diagram illustrating an exemplary student database;

DESCRIPTION OF EMBODIMENTS

However, the technology described in the background does not mention on how to group the plurality of students in order to improve the training effects. Therefore, there remains a problem to be solved as to how to group the plurality of students in order to improve the training effects for a student in a cooperative learning class type in which discussions are conducted in a group. Especially, it has been a problem that it is unable to know how to group the students in a better way when the grouping is intended to obtain a high training effect for a specific student in a group (student to be trained) is intended.

Accordingly, it is desired to improve the training effects for a student to be trained in group discussion.

Figure 1:
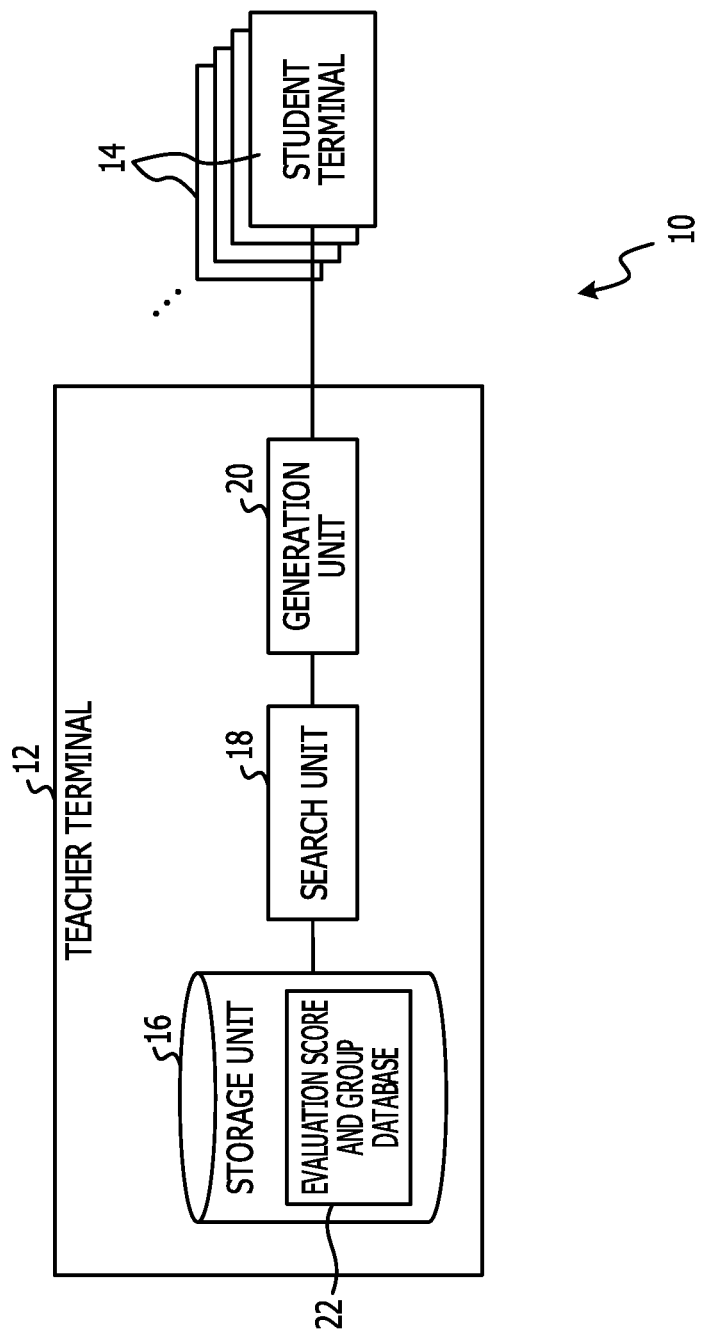
FIG. 1 is a diagram illustrating a functional block for an education support system.

Hereinafter, an example of an embodiment of the disclosed technology will be described in detail with reference to the drawings. FIG. 1 illustrates an education support system 10 according to the present embodiment. The education support system 10 includes a teacher terminal 12 used by a teacher who conducts a class and a plurality of student terminals 14 used by individual students who take the class. The teacher terminal 12 includes a storage unit 16, a search unit 18 and a generation unit 20. An evaluation score and group DB 22 is stored in the storage unit 16.

In the present embodiment, a group discussion (a cooperative learning) is conducted regularly in a class using the education support system 10 for a plurality of curriculum subjects. Students are divided into a plurality of groups and an individual student decides his opinion on an allocated assignment. A discussion is then conducted in the group to arrange the opinions of individual students. Further, the grouping of students is changed each time by a grouping process, which will be described below, for each group discussion. Further, after each group discussion is completed, the degree of achievement is scored as an evaluation score with respect to plural kinds of evaluation items (skill items) for each individual student. Further, an example of the plural kinds of evaluation items (skill items) may include, for example, "capability for explanation of his opinion," "capability for listening skill," and "leadership strength."

An evaluation score for each of the plural kinds of evaluation items (skill items) in each group discussion and a group to which the individual student belonged in each group discussion are registered in the evaluation score and group DB 22 stored in the storage unit 16 for each curriculum subject with respect to the individual student as illustrated in, for example, FIG. 2. Further, in FIG. 2, the evaluation score evaluates the degree of achievement for each evaluation item (skill item) in each group discussion for a curriculum subject (e.g., ZZZZZ) as an example in five grades from "1" to "5". Further, the field for "date" in FIG. 2 indicates the date at which the group discussion is conducted. For example, in FIG. 2, regarding a student (e.g., AAAA), "2" is registered as the evaluation score of evaluation item 1, "3" as the evaluation score of evaluation item 2, and "3" as the evaluation score of evaluation item 3 in the evaluation score and group DB 22 in a group discussion conducted on January 9.

Further, in the present embodiment, a specific student to be trained among the individual students is chosen and an evaluation item to be trained is selected among the plurality of evaluation items in grouping the students for conducting the group discussion. Based on information registered in the evaluation score and group DB 22, the search unit 18 searches for a student for whom an evaluation score of the evaluation item to be trained in the group discussion which was conducted in the past is improved by a predetermined point or more and further, the evaluation score is maintained in an improved high score in a group discussion conducted after the past group 4 discussion. Further, hereinafter, the student extracted by the searching operation of the search unit 18 is referred to as a "student of training criteria".

The generation unit 20 extracts a student who belonged to the same group as that to which the student of training criteria belonged in the group discussion where the evaluation score of the evaluation item to be trained of the student of training criteria searched by the search unit 18 is improved by a predetermined point or more among the group discussions which was conducted in the past. Also, the generation unit 20 performs the grouping of the students for the group discussion such that the extracted student and the student to be trained belong to the same group.

Further, in the disclosed technology, the storage unit 16 is an example of a storage unit, the search unit 18 is an example of a first search unit and second search unit, and the generation unit 20 is an example of a generation unit.

Figure 3:
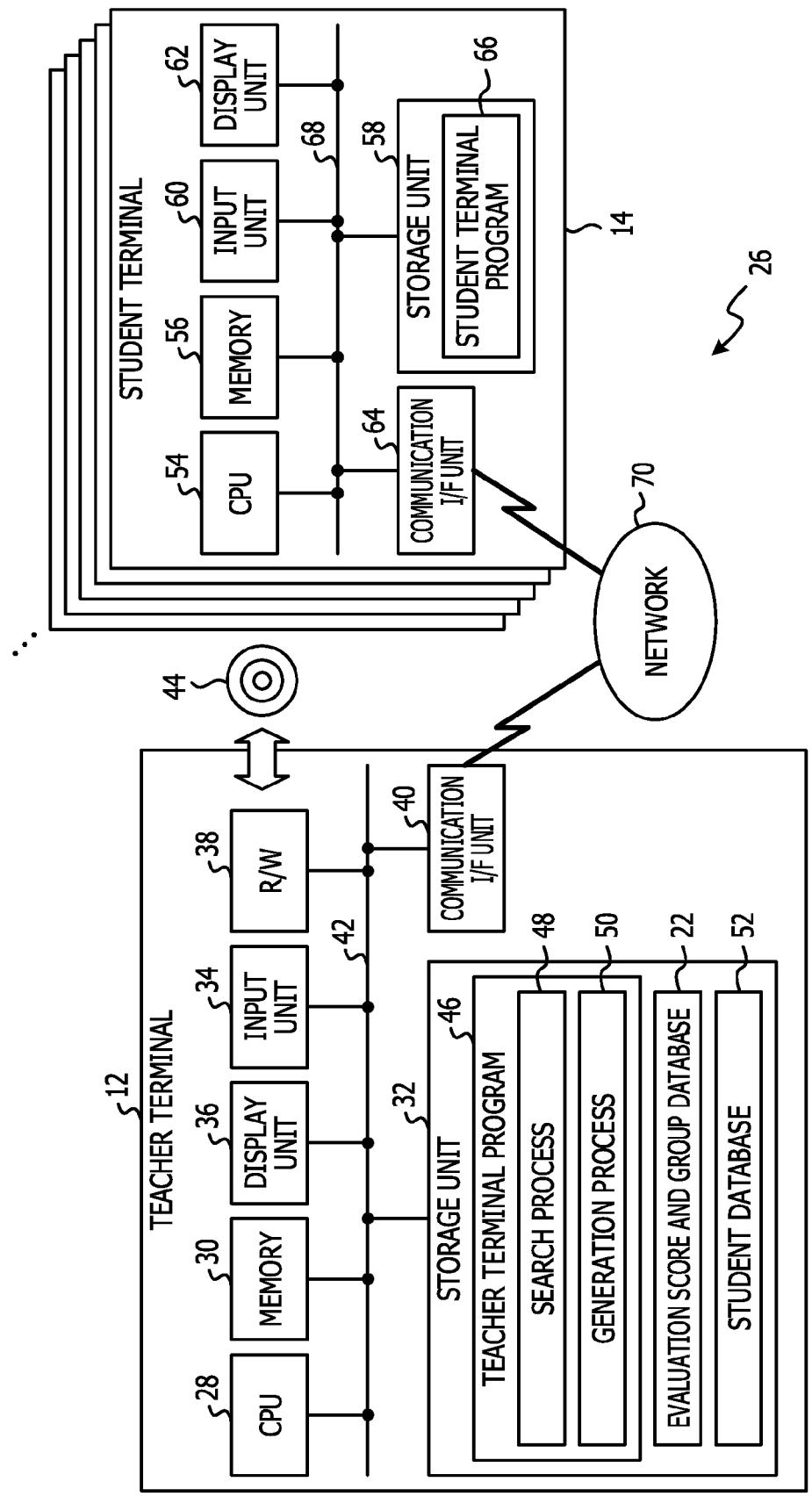
FIG. 3 is a diagram illustrating a configuration of the education support system.

The education support system 10 may be implemented with a computer system 26 illustrated in FIG. 3. The computer system 26 illustrated in FIG. 3 includes, for example, the teacher terminal 12 and the plurality of student terminals 14 connected to the teacher terminal 12 through a network 70 such as a wireless LAN.

The teacher terminal 12 includes, for example, a CPU 28, a memory 30, a storage unit 32, an input unit 34, a display unit 36, a medium reader/writer (R/W) 38 and a communication interface (I/F) unit 40. The CPU 28, the memory 30, the storage unit 32, the input unit 34, the display unit 36, the medium reader/writer 38 and the communication I/F unit 40 may be connected with each other through a bus 42. The medium reader/writer 38 reads information written in the recording medium 44 and writes information into the recording medium 44.

Further, for example, a PC (Personal Computer) or a tablet type terminal may be adopted as the teacher terminal 12. When the PC is adopted as the teacher terminal 12, the input unit 34 may include a keyboard and a mouse. Further, when the tablet type terminal is adopted as the teacher terminal 12, the input unit 34 may include a touch panel sensor provided to overlap with the display unit 36.

The storage unit 32 is implemented by, for example, a HDD (Hard Disk Drive) or a flash memory. A teacher terminal program 46 may be stored in the storage unit 32.

The teacher terminal program 46 may be stored in the storage unit 32 in such a manner the recording medium 44 in which the teacher terminal program 46 is written is set in the medium reader/writer 38 and the medium reader/writer 38 reads the teacher terminal program 46 from the recording medium 44. The CPU 28 reads the teacher terminal program 46 from the storage unit 32 to be deployed in the memory 30 to sequentially execute the processes included in the teacher terminal program 46.

The teacher terminal program 46 includes, for example, a search process 48 and a generation process 50. The CPU 28 may execute the search process 48 so as to function as the search unit 18. Further, the CPU 28 may execute the generation process 50 so as to function as the generation unit 20. By doing this, the teacher terminal 12 which has executed the teacher terminal program 46 may function as an example of an education support apparatus according to the disclosed technology. Further, the teacher terminal program 46 is an example of an education support program according to the disclosed technology.

Further, the evaluation score and group DB 22 may be stored in the storage unit 32. Accordingly, the storage unit 32 may function as the storage unit 16 illustrated in FIG. 1. Further, the student DB 52 may be stored in the storage unit 32. As illustrated in FIG. 4, the student DB 52 may be provided with various fields such as, for example, "student identifier", "student name" and "IP address," and information of individual students are set in the respective records. Further, an IP address of the student terminal 14 used by an individual student may be set in the "IP address" field. The teacher terminal 12 may refer to the student DB 52 to identify the student terminal 14 used by an individual student.

In the meantime, the student terminal 14 may include a CPU 54, a memory 56, a storage unit 58, an input unit 60, a display unit 62 and a communication interface (I/F) unit 64. The CPU 54, the memory 56, the storage unit 58, the input unit 60, the display unit 62 and the communication I/F unit 64 may be connected with each other thorough a bus 68. The tablet type terminal is suitable for the student terminal 14. When the tablet type terminal is adopted as the student terminal 14, the input unit 60 may include the touch panel sensor provided to overlap with the display unit 62. The student terminal program 66 may be installed in the storage unit 58.

Figure 5:
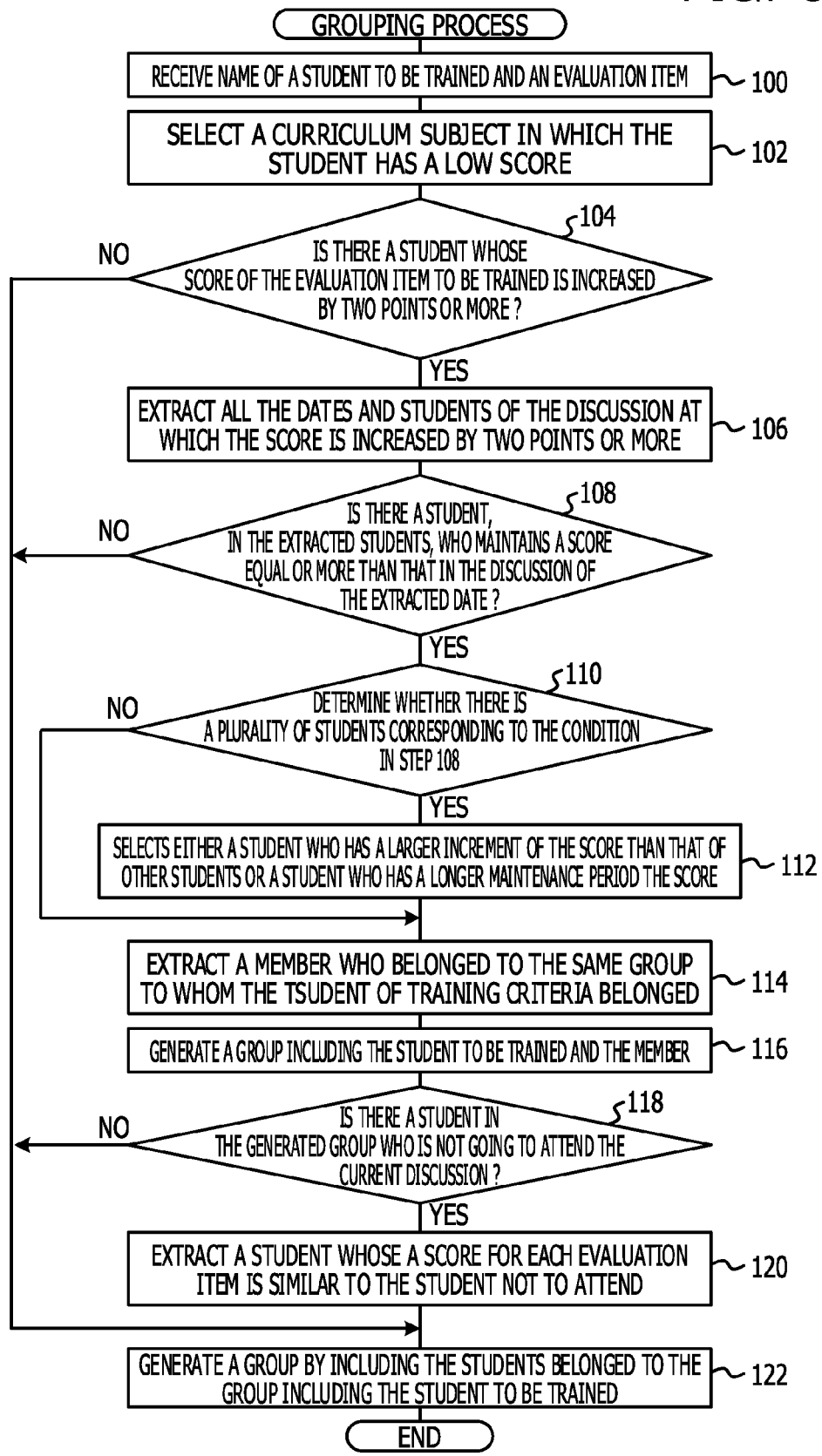
FIG. 5 is a flowchart illustrating an exemplary process of a grouping process.

Next, as operation of the present embodiment, the grouping process will be described with reference to FIG. 5. The grouping process is performed in such a manner that an instruction to perform a grouping for conducting the group discussion is issued by the teacher using the teacher terminal 12 in a state where the teacher terminal program 46 is being executed in the CPU 28 of the teacher terminal 12. The grouping process may be performed either immediately before the group discussion or before the day before a date at which the group discussion is conducted.

Figure 6:
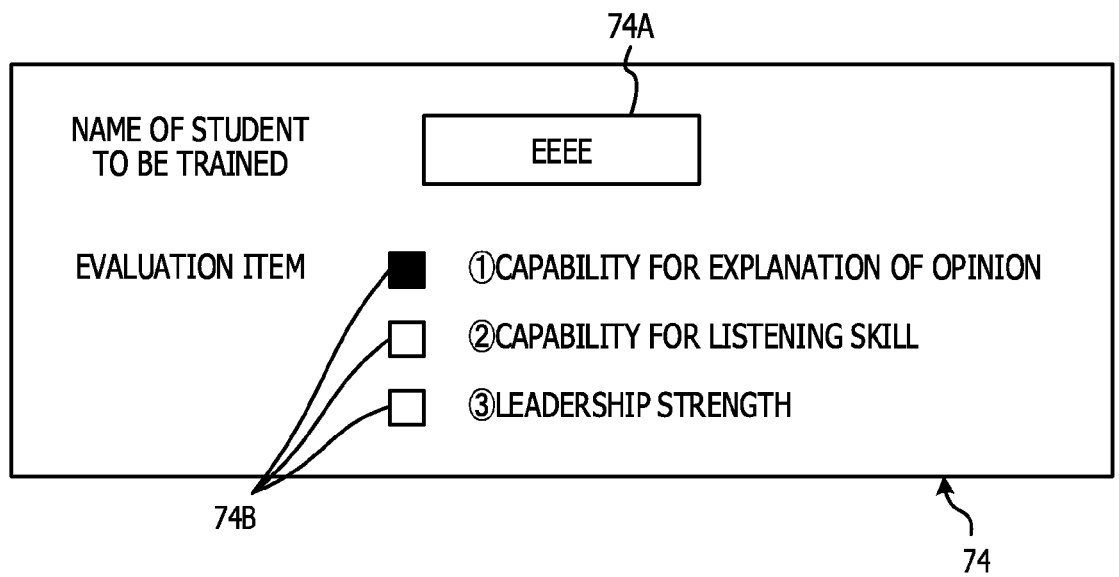
FIG. 6 is a diagram illustrating an exemplary display for setting a student and item to be trained displayed on a screen of teacher terminal.

At step 100, the search unit 18 displays a training target set screen 74 as illustrated in FIG. 6 on the display unit 36 of the teacher terminal 12. The training target set screen 74 is provided with an input column 74A for inputting the name of a student to be trained and a plurality of selection columns 74B for selecting the evaluation item to be trained among the plural kinds of evaluation items (skill items). When the training target set screen 74 is displayed on the display unit 36 of the teacher terminal 12, the teacher who is using the teacher terminal 12 inputs the name of the student who is set as a student to be trained in the input column 74A in this group discussion, and selects the evaluation item to be trained through the selection column 74B. By doing this, the search unit 18 receives the name of the student to be trained and the evaluation item to be trained.

At step 102, the search unit 18 selects a curriculum subject having a low evaluation score of the evaluation item to be trained received at step 100 with respect to the student to be trained received at step 100 among the plurality of curriculum subjects of which information are registered in the evaluation score and group DB 22.

At step 104, the search unit 18 refers to the evaluation score and group DB 22 to search for a student for whom the evaluation score of the evaluation item to be trained is increased by 2 (two) points or more in the curriculum subject selected at step 102, and determines whether the corresponding student exists. When the determination result at step 104 is "YES", the grouping process proceeds to step 106 and otherwise, when the determination result at step 104 is "NO", the process proceeds to step 122.

For example, when it is assumed that the curriculum subject is ZZZZZ and the evaluation item to be trained is evaluation item 1, the evaluation score for evaluation item 1 of the student AAAA is increased from "2" to "4" as represented with denoting by "(1)" in the evaluation score and group DB 22 illustrated in FIG. 2 in the group discussion conducted on January 23. Further, the evaluation score for evaluation item 1 of the student CCCC is increased from "1" to "3" as represented with denoting by "(2)" in the evaluation score and group DB 22 illustrated in FIG. 2 in the group discussion conducted on January 16. In this case, the determination result at step 106 is "YES" and thus the process proceeds to step 106.

At step 106, the search unit 18 extracts all the dates and students of the group discussion at which the evaluation score of the evaluation item to be trained is increased by two points or more than that obtained in a previous group discussion from the evaluation score and group DB 22. For example, when it is assumed that the curriculum subject is ZZZZZ and the evaluation item to be trained is evaluation item 1, a pair of the student AAAA and the date (January 23) and a pair of the student CCCC and the date (January 16) are extracted, respectively, from the evaluation score and group DB 22 illustrated in FIG. 2.

At step 108, the search unit 18 determines whether there is a student who maintains an evaluation score, which is equal to or greater than that obtained in the group discussion conducted at an extracted date, also in the group discussion conducted at a date after the extracted date. When the determination result at step 108 is "YES", the process proceeds to step 110 and otherwise, when the determination result at step 108 is "NO", the process proceeds to step 122.

For example, the evaluation score for evaluation item 1 of the student AAAA is still maintained at "4" in the group discussion conducted on January 30 which is the date of the next group discussion after the date (January 23), as represented with denoting by "(3)", in the evaluation score and group DB 22 illustrated in FIG. 2. In the meantime, for example, the evaluation score for evaluation item 1 of the student CCCC is decreased from "3" to "2" in the group discussion conducted on January 23 which is the date of the next group discussion after the date (January 16), as represented with denoting by "(4)", in the evaluation score and group DB 22 illustrated in FIG. 2. In this case, the determination result for the student AAAA at step 108 is "YES" and thus the process proceeds to step 110.

At step 110, the search unit 18 determines whether there is a plurality of students who correspond to the determination result of "YES" at step 108. When it is determined that the determination result at step 110 is "YES", the process proceeds to step 112 and otherwise, when the determination result at step 110 is "NO", the process proceeds to step 122. Further, when the determination result at step 110 is "NO", the only student who corresponds to the determination result of "YES" at step 108 becomes the student of training criteria.

Further, when it is determined that there is a plurality of students who correspond to the determination result of "YES" at step 108, the search unit 18 selects either a student who has a larger increment of the evaluation score than that of other students or a student who has a longer maintenance period of increment of the evaluation score than that of other students among the plurality of students who correspond to the determination result of "YES" at step 108 as the student of training criteria, at step 112.

At step 114, the generation unit 20 extracts a member, who belonged to the same group as that to which the student of training criteria belonged, in an extracted date (date of the group discussion at which the evaluation score of the evaluation item to be trained with respect to the student of training criteria is increased by two points or more than that obtained in the previous group discussion).

For example, when the curriculum subject is ZZZZZ and the evaluation item to be trained is evaluation item 1, the student AAAA belongs to group "ccc" as represented with denoting by "(5)" in the group discussion conducted on January 23 at which the evaluation score for evaluation item 1 of the student AAAA is increase from "2" to "4". The members who belong to group "ccc" at the same date of 1/23 are the student DDDD, the student FFFF and the student GGGG as represented with denoting by "(5)". Accordingly, in this example, the student DDDD, the student FFFF and the student GGGG are extracted as the members who belonged to the same group as that to which the student of training criteria belonged at step 114.

At step 116, the generation unit 20 newly generates a group in this group discussion with the student to be trained and the members extract at step 114. For example, when the student to be trained is the student EEEE and the student DDDD, the student FFFF and the student GGGG are extracted at step 114, a group is generated in which the student DDDD, the student FFFF and the student GGGG are included in addition to the student EEEE to be trained.

At step 118, the generation unit 20 determines whether there is a member who does not participate in the current group discussion among the members of the group generated at step 116. When it is determined that the determination result at step 118 is "YES", the process proceeds to step 120 and otherwise when the determination result at step 118 is "NO", the process proceeds to step 122. At step 120, the generation unit 20 extracts a student who has obtained an evaluation score for each evaluation item which is similar to the non-participating member to add the extracted student in the group instead of the non-participating member.

For example, when a group is generated consisting of the student EEEE, the student DDDD, the student FFFF and the student GGGG, the student GGGG is regarded as not participating in the current group discussion (February 6) according to the evaluation score and group DB 22 illustrated in FIG. 2. In this case, the determination result at step 118 is "YES" and thus the process proceeds to step 120.

Here, the evaluation scores of the student GGGG after the group discussion conducted on January 23 are "2" for evaluation item 1, "4" for the evaluation item 2 and "3" for the evaluation item 3, respectively. The evaluation scores of the student HHHH after the latest group discussion conducted on January 30 are the same as that of the student GGGG after the group discussion conducted on January 23 and specifically, the evaluation scores of the student HHHH are "2" for evaluation item 1, "4" for the evaluation item 2 and "3" for the evaluation item 3, respectively. Therefore, in this example, the student HHHH is added to the group instead of the non-participating student GGGG who does not participate as represented with denoting by "(6)" in FIG. 2 and thus, the group consisting of the student EEEE, the student DDDD, the student FFFF and the student HHHH is generated at step 120.

By doing the processes as described above, when the group in which the student to be trained belongs is generated, the process proceeds to step 122 and the generation unit 20 generates a group by including the student who did not belong to the group, at step 122. For example, a method in which the student who did not belong to the group is randomly selected to generate the group, may be applied for generating the group at step 122.

Further, a method may also be applied in which the student of training criteria is newly selected among the students who did not belong to the group student and a process consisting of step 104 to step 120 of FIG. 5 is performed again to generate the group. In this case, at least one of a condition that the evaluation score increment criteria is set to 1 (one) point or more and another condition that a determination is omitted as to whether the evaluation score equal to or greater than that obtained in the previous group discussion is maintained in the next group discussion, may be applied. When the processing of step 122 is performed, the grouping process ends.

Figure 7:
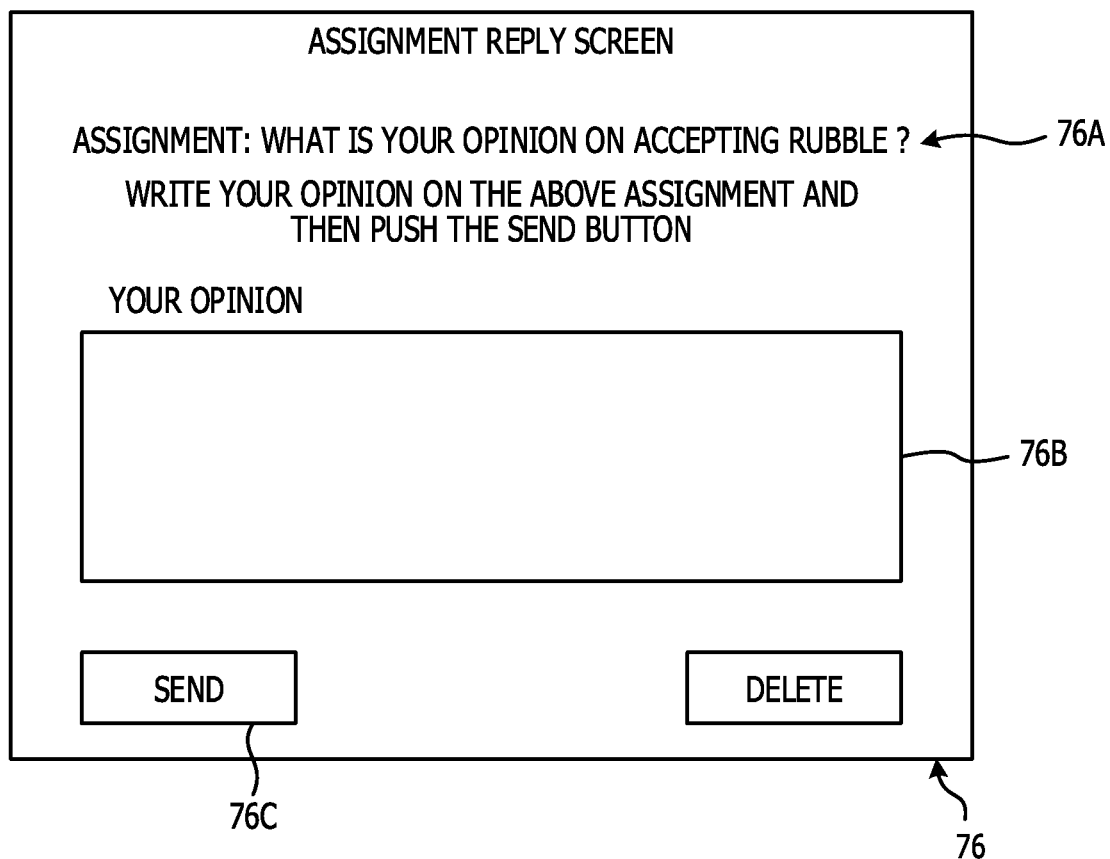
FIG. 7 is a diagram illustrating an exemplary display of an assignment reply displayed on a screen of a student terminal.

Next, descriptions will be made on a group discussion which is conducted by being divided into groups based on a result of the grouping process. When a group discussion is conducted, first, the teacher sets an assignment (topic) for the group discussion in the teacher terminal 12. When setting of the assignment is completed, the set assignment is transmitted from the teacher terminal 12 to individual student terminals 14 and an assignment reply screen 76 illustrated in FIG. 7 is displayed on a display units 62 of the individual student terminal 14.

The assignment reply screen 76 is provided with a display column 76A for displaying the assignment which is set by the teacher, an input column 76B for inputting an opinion for the assignment, and a transmission button 76C for transmitting the opinion. When the assignment reply screen 76 is displayed on the display unit 62 of the student terminal 14, the individual student thinks about the assignment, prepares his opinion about the assignment and inputs the prepared opinion into the input column 76B.

When inputting the opinion is completed, the opinions input through the transmission button 76C depressed by individual students are transmitted to the teacher terminal 12 and a list of opinions input by the individual students are displayed on the display unit 36 of the teacher terminal 12. Further, the teacher terminal 12 divides the opinions received from the individual student terminals 14 into each group in this group discussion and transmits the opinions divided into each group to the student terminals 14 of the students who belong to each group, respectively. By doing this, the list of the opinions of respective students who belong to the same group are displayed on the display unit 62 of the student terminal 14.

When the list of opinions of respective students who belong to the same group is displayed on the display unit 62 of the individual student terminal 14, the students are grouped and the group discussion is conducted. In the group discussion, each student who belongs to the group explains his opinion in sequence while referring to the list of opinions of each student displayed on the display unit 62 of the student terminal 14. Also, discussion is conducted on each opinion to narrow an opinion representative of the group or forms a new opinion representative of the group. Also, thereafter, each group presents the opinion representative of the group. By doing this, thinking skills, judgments and the ability to express of individual student are trained.

It is difficult to directly evaluate whether the remaining students of a group excluding a specific student have a talent for improving the skill for an evaluation item to be trained of a certain student though a group discussion. However, when an evaluation score for an evaluation item to be trained of the student of training criteria is improved in a group discussion conducted on a certain date, it may be inferred that the remaining students who belong to the group have the talent for improving the skill for an evaluation item to be trained of other student though the group discussion. For example, when the evaluation score for the evaluation item of "capability for explanation of his opinion" of the student of training criteria is improved in a group discussion conducted on a certain date, it is inferred that the remaining students who belong to the group have the talent for drawing opinions of others by demonstrating leadership.

A student is searched based on the above description as the student of training criteria that the evaluation score of the evaluation item is improved in the group discussion conducted in the past. Also, the grouping is performed in such a manner that a student (the student except for the student of training criteria) who belong to the same group as that of the searched student of training criteria in the group discussion conducted in the past is allowed to belong to the same group as that of the student to be trained. By doing this, the grouping may be performed so as to improve the training effects on the student to be trained in the group discussion.

Further, a student that an evaluation score of the evaluation item in the group discussion conducted in the past is improved and further, the evaluation score is maintained in an improved high score in a group discussion conducted after the past group discussion, is searched as the student of training criteria. By doing this, even when an assignment of the group discussion is changed, the student who acquires a skill with which the evaluation score may be maintained in a high score with respect to the evaluation item to be trained is extracted as the student of training criteria. Accordingly, the grouping may be performed such that the training effects on the student of training criteria may be obtained more steadily in the group discussion.

Further, while only one evaluation item may be prepared in the disclosed technology, the plural kinds of evaluation items are prepared in the present embodiment. Also, a student is searched for whom the evaluation score corresponding to the evaluation item selected as an object to be trained among the evaluation scores of the plural kinds of evaluation items has been improved in the group discussion conducted in the past. By doing this, in the group discussion, the grouping may be performed in such a manner that the training effects on the student to be trained is achieved with respect to the evaluation item to be trained.

Further, when a plurality of students are extracted by searching for the student of training criteria, a student who has greater improvement of the evaluation score than that of the other students or a student who has a longer maintenance period of improvement of the evaluation score than that of the other students is selected among the plurality of extracted students. By doing this, a student who acquires a higher skill with respect to the evaluation item to be trained or a student who acquires a skill with which the evaluation score may be maintained in a high score with respect to the evaluation item to be trained is extracted as the student of training criteria even when an assignment of group discussion is changed. Accordingly, the grouping may be performed such that the training effects on the student of training criteria may be obtained more steadily in the group discussion.

Further, when the student who belongs to the same group as that of the searched student in the group discussion conducted in the past does not participate in the group discussion, a student who has obtained an evaluation score similar to that of the student who does not participate in the group discussion is searched and added in the same group as that of the student of training criteria. By doing this, even when a student appears who is not able to participate in the current group discussion among the students who belong to the same group as that of the student of training criteria, grouping may be performed so as to achieve improvement of the training effects on the student of training criteria.

Finally, descriptions will be made on a scoring method of the evaluation score after the group discussion is completed. Two scoring methods of the evaluation score may be considered. A first scoring method is a method in which the individual student evaluates his skill to score the evaluation score.

Figure 8:
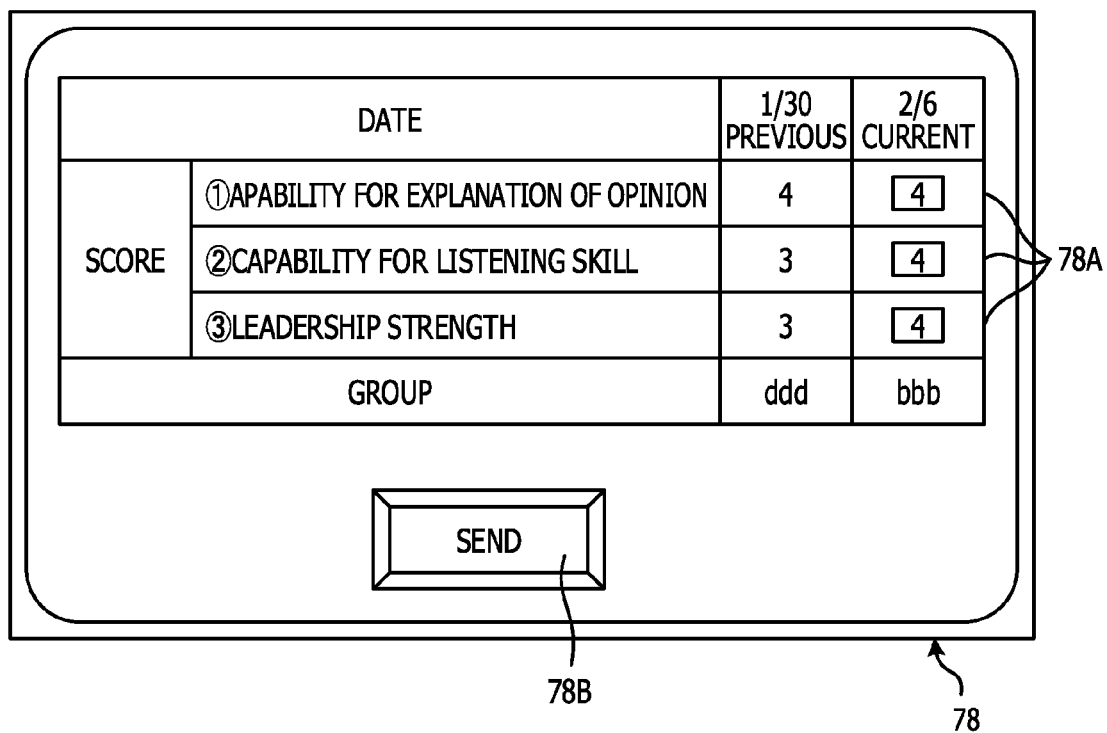
FIG. 8 is a diagram illustrating an exemplary display of skill evaluation displayed on the screen of the student terminal.

The teacher instructs the individual student to evaluate his skill to input the evaluation score at the time when the group discussion is completed. It does not matter whether the instruction is made verbally or through a pop-up window from the teacher terminal 12 to the student terminal 14. When the individual student inputs his evaluation score, for example, a skill evaluation screen 78 as illustrated in FIG. 8 is displayed on the display unit 62 of the individual student terminal 14. The skill evaluation screen 78 is provided with a plurality of input columns 78A for inputting the evaluation score for each evaluation item and a transmission button 78B for transmitting the input evaluation score.

The individual student manipulates the input unit 60 of the student terminal 14 according to instruction of the teacher to input his evaluation score for each evaluation item in the input columns 78A, and depresses the transmission button 78B. By doing this, the evaluation score for each evaluation item is transmitted from the student terminal 14 to the teacher terminal 12, and thus, a corresponding portion of the evaluation score and group DB 22 is updated as represented with denoting by "(7)" in FIG. 2.

A second scoring method is a method in which the individual student evaluates skill of other student who belongs to the same group to score the evaluation score.

Figure 9:
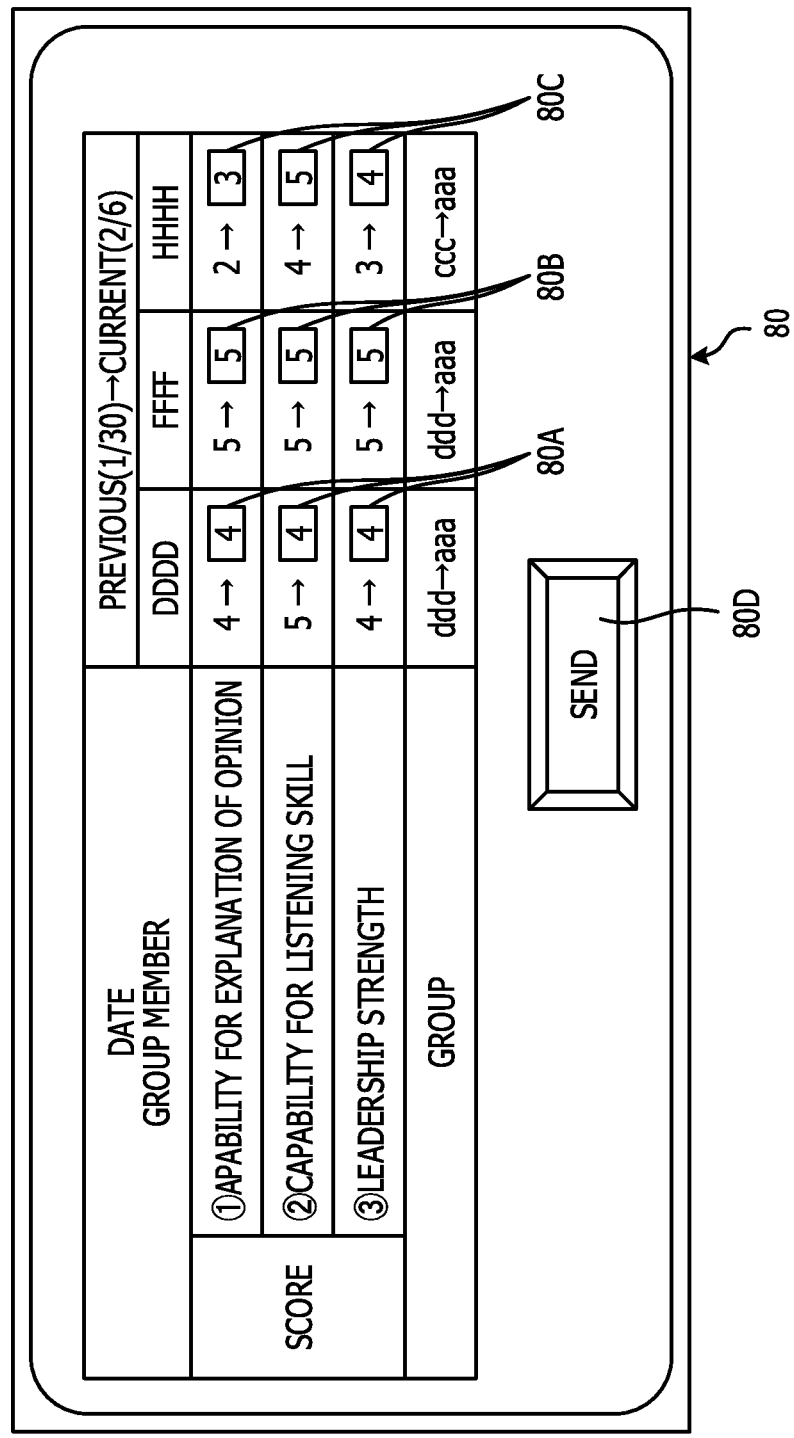
FIG. 9 is a diagram illustrating another exemplary display of skill evaluation displayed on the screen of the student terminal.

The teacher instructs the individual student to evaluate the skill of other student who belongs to the same group to input the evaluation score at the time when the group discussion is completed. It does not matter whether the instruction is made verbally or through a pop-up window from the teacher terminal 12 to the student terminal 14. When the individual student inputs the evaluation score of other student who belongs to the same group, for example, a skill evaluation screen 80 as illustrated in FIG. 9 is displayed on the display unit 62 of the individual student terminal 14. The skill evaluation screen 80 is provided with a plurality of input columns 80A, 80B and 80C for inputting the evaluation score for each evaluation item and a transmission button 80D for transmitting the input evaluation score.

The individual student manipulates the input unit 60 of the student terminal 14 according to the instruction of the teacher to input the evaluation score of other student who belongs to the same group for each evaluation item in the input columns 80A, 80B and 80C, and depresses the transmission button 80D. By doing this, the evaluation score for each evaluation item is transmitted from the student terminal 14 to the teacher terminal 12. When the data of all the students are received, the teacher terminal 12 computes (rounding off a decimal) an average value of the evaluation score for each evaluation item for each individual student to update the corresponding portion of the evaluation score and group DB 22.

For example, when "4" points are scored from the student EEEE, "3" points are scored from the student FFFF and "5" points are scored from the student HHHH with respect to the evaluation score of evaluation item 1 for the student DDDD, the evaluation score of the evaluation item 1 becomes "(4+3+5)/3"="4" (see "(8)" of FIG. 2). Further, for example, when "4" points are scored from the student EEEE, "5" points are scored from the student FFFF and "4" points are scored from the student HHHH with respect to the evaluation score of evaluation item 2 for the student DDDD, the evaluation score of the evaluation item 2 becomes "(4+5+4)/"="4.3" and is finally rounded off to become "4" (see "(8)" of FIG. 2). Still further, for example, when "4" points are scored from the student EEEE, "5" points are scored from the student FFFF and "5" points are scored from the student HHHH with respect to the evaluation score of evaluation item 3 for the student DDDD, the evaluation score of the evaluation item 1 becomes "(4+5+5)/"="4.7" and is finally rounded off to become "5" (see "(8)" of FIG. 2).

Further, an aspect in which the teacher terminal 12 is served as the education support apparatus is described in the above description, but a server may be separately provided from the teacher terminal 12 and the server may be allowed to serve as an education support apparatus.

Further, an aspect in which a curriculum subject is selected after the name of the student to be trained and an evaluation item to be trained are selected has been described in the above description, but the curriculum subject may be selected first and then the name of the student to be trained is selected to select the evaluation item having a low evaluation score of the selected student as an evaluation item to be trained.

Further, an aspect in which a teacher terminal program 46 which is an example of an education support program according to the disclosed technology is previously stored (installed) in the storage unit 32 of the teacher terminal 12, but the present disclosure is not limited thereto. The education support program according to the disclosed technology may be provided in a form of being recorded in a recording medium such as a CD-ROM, a DVD-ROM or a memory card.

All the documents, patent applications and technical standards described in the present specification are regarded as incorporated in the specification to the same extent that the document, patent application and technical standard are individually and specifically described in the specification.

The appended claims are intended to encompass the embodiments described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing an education support program that, when executed, causes a computer to perform an education support method, the education support method comprising:
    storing, for each of a plurality of students, history information and group information, the history information indicating a transition of evaluation scores regarding a degree of achievement regarding at least one evaluation item for each of a plurality of group discussions, and the group information indicating a group in which each student is involved for each of the plurality of group discussions, the group being one of a plurality of groups;
    receiving a designation of a first student to be trained from among the plurality of students;
    identifying a second student from among the plurality of students based on the history information, the second student having specific history information indicating that the evaluation score has been improved more than a threshold;
    identifying a specific group discussion, from among the plurality of group discussions, in which the evaluation score of the second student has improved more than the threshold;
    identifying a specific group, from among the plurality of groups, in which the second student was involved for the specific group discussion;
    extracting at least one third student, other than the second student, from among the students who are involved in the specific group;
    grouping the first student to be trained and the at least one third student for a next group discussion; and
    outputting an instruction to display a screen on respective terminal devices of the first student and the at least one third student, the screen displaying a plurality of opinions inputted by the first student and the at least one third student in the next group discussion.

2. The computer-readable recording medium according to claim 1, wherein the identifying of the second student from among the plurality of students further comprises identifying the second student based on specific history information indicating that the evaluation score that has improved more than the threshold is maintained in a group discussion conducted after the specific group discussion, and
    the identifying of the specific group discussion further comprises identifying a specific group discussion during which the evaluation score of the second student that has improved more than the threshold is maintained in the group discussion after the specific group discussion.

3. The computer-readable recording medium according to claim 1, wherein the storing of the history information and the group information further comprises storing, for each of the plurality of students, a plurality of evaluation items that are different from each other and a plurality of evaluation scores corresponding to respective evaluation items,
    the identifying of the second student further comprises selecting an evaluation item, from among the plurality of evaluation items, and identifying the second student based on specific history information indicating that the evaluation score corresponding to the selected evaluation item has improved more than the threshold, and
    the identifying of the specific group discussion includes identifying the specific group discussion in which the evaluation score of the second student corresponding to the selected evaluation item has improved more than the threshold.

4. The computer-readable recording medium according to claim 2, wherein the identifying of the second student further comprises:
    determining whether there are a plurality of students whose specific history information indicates that their evaluation score that has improved more than the threshold, and
    identifying, as the second student, a student having a greatest improvement in evaluation score among the plurality of students having an evaluation score that has improved more than the threshold.

5. The computer-readable recording medium according to claim 2, wherein the identifying of the second student further comprises:
    determining whether there are a plurality of students whose specific history information indicates that their evaluation score has improved more than the threshold and is maintained in a group discussion conducted after the specific group discussion, and
    identifying, as the second student, a student having an improved evaluation score that is maintained longer than that of the other students.

6. An education support method, comprising:
    storing, for each of a plurality of students, history information and group information, the history information indicating a transition of evaluation scores regarding a degree of achievement regarding at least one evaluation item for each of a plurality of group discussions, and the group information indicating a group in which each student is involved for each of the plurality of group discussions, the group being one of a plurality of groups;
    receiving a designation of a first student to be trained from among the plurality of students;
    identifying a second student from among the plurality of students based on the history information, the second student having specific history information indicating that the evaluation score has been improved more than a threshold;
    identifying a specific group, from among the plurality of groups, in which the second student was involved for the specific group discussion;
    extracting at least one third student, other than the second student, from among the students who are involved in the specific group;
    grouping the first student to be trained and the at least one third student for a next group discussion; and
    outputting an instruction to display a screen on respective terminal devices of the first student and the at least one third student, the screen displaying a plurality of opinions inputted by the first student and the at least one third student in the next group discussion.

7. The education support method according to claim 6, wherein the identifying of the second student from among the plurality of students further comprises identifying the second student based on specific history information indicating that the evaluation score that has improved more than the threshold is maintained in a group discussion conducted after the specific group discussion, and, the identifying of the specific group discussion further comprises identifying a specific group discussion during which the evaluation score of the second student that has improved more than the threshold is maintained in the group discussion after the specific group discussion.

8. The education support method according to claim 6, wherein the storing of the history information and the group information further comprises storing, for each of the plurality of students, a plurality of evaluation items that are different from each other and a plurality of the evaluation scores corresponding to respective evaluation items,
the identifying of the second student further comprises selecting an evaluation item, from among the plurality of evaluation items, and identifying the second student based on specific history information indicating that the evaluation score corresponding to the selected evaluation item has improved more than the threshold, and
the identifying of the specific group discussion includes identifying the specific group discussion in which the evaluation score of the second student corresponding to the selected evaluation item has improved more than the threshold.

9. The education support method according to claim 6, wherein the identifying of the second student further comprises:
determining whether there are a plurality of students whose specific history information indicates that their evaluation score that has improved more than the threshold, and
identifying, as the second student, a student having a greatest improvement in evaluation score among the plurality of students having an evaluation score that has improved more than the threshold.

10. The education support method according to claim 6, wherein the identifying of the second student further comprises:
determining whether there are a plurality of students whose specific history information indicates that their evaluation score has improved more than the threshold and is maintained in a group discussion conducted after the specific group discussion, and
identifying, as the second student, a student having an improved evaluation score that is maintained longer than that of the other students.

11. The education support method according to claim 6, further comprising searching for history information of a student having an evaluation score similar to that of the at least one third student when the extracted at least one third student does not participate in the group discussion, and grouping the first student to be trained with the student having the evaluation score similar to that of the at least one third student.

12. The education support method according to claim 6, wherein the evaluation score is scored by evaluation of an individual student himself or evaluation of an other student who belongs to a same group.

13. An education support apparatus, comprising:
a memory storing an education support program;
a processor configured to execute the education support program, the education support program causing the processor to:
store in a database, for each of a plurality of students, history information and group information, the history information indicating a transition of evaluation scores regarding a degree of achievement regarding at least one evaluation item for each of a plurality of group discussions, and the group information indicating a group in which each student is involved for each of the plurality of group discussions, the group being one of a plurality of groups;
receive a designation of a first student to be trained from among the plurality of students;
identify a second student from among the plurality of students based on the history information, the second student having specific history information indicating that the evaluation score has been improved more than a threshold;
identify a specific group discussion, from among the plurality of group discussions, in which the evaluation score of the second student has improved more than the threshold;
identify a specific group, from among the plurality of groups, in which the second student was involved for the specific group discussion;
extract at least one third student, other than the second student, from among the students who are involved in the specific group;
group the first student to be trained and the at least one third student for a next group discussion; and
output an instruction to display a screen on respective terminal devices of the first student and the at least one third student, the screen displaying a plurality of opinions inputted by the first student and the at least one third student in the next group discussion.

14. The education support apparatus according to claim 13,
wherein the processor is further configured to execute the education support program, the education support program further causing the processor to:
identify the second student from among the plurality of students by identifying the second student based on specific history information indicating that the evaluation score that has improved more than the threshold is maintained in a group discussion conducted after the specific group discussion, and
identify of the specific group discussion by identifying a specific group discussion during which the evaluation score of the second student that has improved more than the threshold is maintained in the group discussion after the specific group discussion.

15. The education support apparatus according to claim 13,
wherein the processor is further configured to execute the education support program, the education support program further causing the processor to:
store the history information and the group information by storing, for each of the plurality of students, a plurality of evaluation items that are different from each other and a plurality of evaluation scores corresponding to respective evaluation items,
identify the second student by selecting an evaluation item, from among the plurality of evaluation items, and identifying the second student based on specific history information indicating that the evaluation score corresponding to the selected evaluation item has improved more than the threshold, and
identify the specific group discussion by identifying the specific group discussion in which the evaluation score of the second student corresponding to the selected evaluation item has improved more than the threshold.

16. The education support apparatus according to claim 13,
wherein the processor is further configured to execute the education support program, the education support program further causing the processor to:
identify the second student from among the plurality of students by searching for the evaluation score that has improved more than a threshold.

17. The education support apparatus according to claim 14,
wherein the processor is further configured to execute the education support program, the education support program further causing the processor to:
identify the second student by:
determining whether there are a plurality of students whose specific history information indicates that their evaluation score that has improved more than the threshold, and
identifying, as the second student, a student having a greatest improvement in evaluation score among the plurality of students having an evaluation score that has improved more than the threshold.

18. The education support apparatus according to claim 14,
wherein the processor is further configured to execute the education support program, the education support program further causing the processor to:
identify the second student by:
determining whether there are a plurality of students whose specific history information indicates that their evaluation score has improved more than the threshold and is maintained in a group discussion conducted after the specific group discussion, and
identifying, as the second student, a student having an improved evaluation score that is maintained longer than that of the other students.

19. The education support apparatus according to claim 13,
wherein the processor is further configured to execute the education support program, the education support program further causing the processor to:
search for history information of a student having an evaluation score similar to that of the at least one third student when the extracted at least one third student does not participate in the group discussion, and group the first student to be trained with the student having the evaluation score similar to that of the at least one third student.

20. The education support apparatus according to claim 13,
wherein the evaluation scores stored in the database are determined by evaluation of an individual student himself or evaluation of an other student who belongs to a same group.

* * * * *